Nov. 17, 1942.    E. H. FISCHER    2,301,939
PRODUCTION OF CERAMIC BODIES
Filed July 31, 1940    3 Sheets-Sheet 2

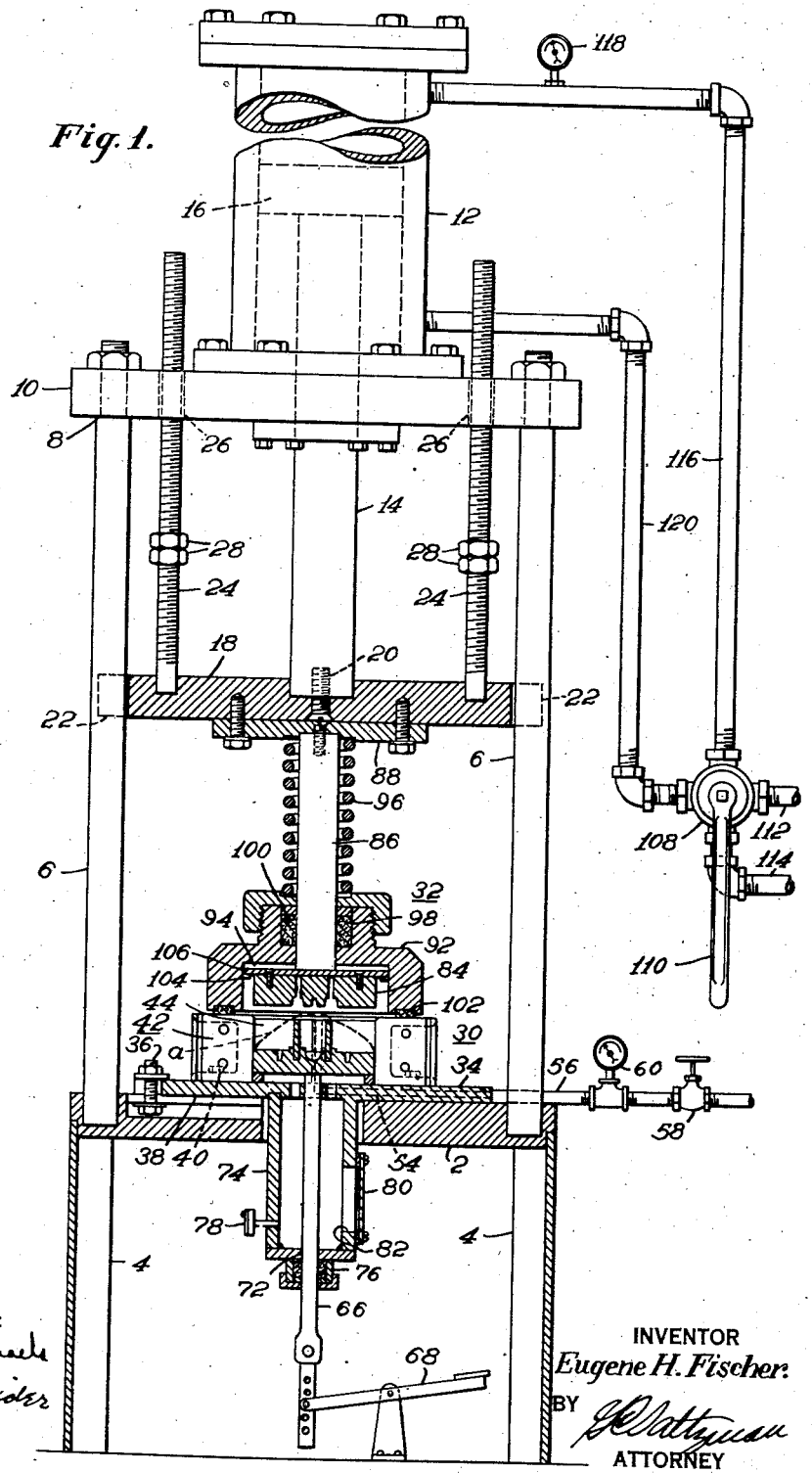

WITNESSES:    INVENTOR
Edward Michaels    Eugene H. Fischer.
David Krider    BY
    ATTORNEY Nov. 17, 1942.                E. H. FISCHER                2,301,939
                       PRODUCTION OF CERAMIC BODIES
                          Filed July 31, 1940              3 Sheets-Sheet 3

WITNESSES:
Edward Michaels
David Kreider

INVENTOR
Eugene H. Fischer
BY
ATTORNEY

Patented Nov. 17, 1942

2,301,939

UNITED STATES PATENT OFFICE 2,301,939

PRODUCTION OF CERAMIC BODIES

Eugene H. Fischer, Derry, Pa., assignor to Westinghouse Electric & Manufacturing Company, East Pittsburgh, Pa., a corporation of Pennsylvania Application July 31, 1940, Serial No. 348,805

12 Claims. (Cl. 25—156)

The present invention relates to the production of ceramic bodies and it has particular relation to an improved method and means for shaping porcelain bodies for firing to produce dense non-porous structures. The invention will be found especially applicable to the production of terminal blocks for transformers, lightning arrester bodies and other types of high-voltage insulators.

Present-day requirements for high-voltage insulating bodies call for a particularly dense structure. A usual test requirement is that these devices show a complete absence of absorption when subjected for a period of five hours or more to fuchine dye combined with alcohol at a pressure of 5000 to 8000 pounds per square inch.

While the simpler forms may be obtained by means of the so-called wet process wherein the procelain material is usually cast in the form of a slip, this process has several disadvantages. In the first place, a relatively expensive plaster mold and auxiliary equipment, such as pins, cores, etc., are required. Shrinkage and other difficulties make it impossible to produce ware having dimensions within allowable tolerances in many cases. The casting and drying times with this method are often excessive, while the shapes which may be produced thereby are limited.

While the well-known dry process may be employed to obtain undistorted ribbed and other complicated shapes, the product cannot be made sufficiently dense for high-voltage work. Even the employment of high pressures in conjunction with an evacuated mold has failed to result in non-porous dye-tight ware except when the simpler shapes are produced.

Prior to this invention, the most satisfactory method of making complicated non-porous ware has been as follows: Blanks of the proper width, length and thickness were extruded in the form of a ribbon, the blanks dried for several days to stiffen the plastic body, and then pressed in a metal die. Because of the plain smooth surfaces presented by the blanks, considerable distortion generally took place and repressing was necessary. In addition, the movement of the clay into the recesses, depressions, etc., resulted in numerous cracks, making it necessary to discard a high percentage of the formed blanks.

According to the present invention, a uniform non-porous porcelain product is produced by pressing a porcelain batch in what may be called a semi-wet state. The batch is placed in an uneven pile in an evacuated mold chamber formed between relatively movable metal dies. Portions of the batch are preferably compacted, as by a tamping action, after which the material is pressed to shape. This method has been found to result in a final fired product having a density much greater than that attainable by the dry-press processes of the prior art. The product meets the dye test for non-porosity, outlined above, and results in a considerable savings over the plastic pressing process previously used.

It is accordingly an object of the present invention to provide a novel and improved method and means for producing non-porous ceramic ware.

Another object of the invention is to provide a method for pressing porcelain shapes to provide a body having substantially the density of cast wet process porcelain.

A further object of the invention is to provide a method for pressing dense uniform porcelain bodies for high-voltage electrical insulation.

It is another object of the invention to provide apparatus for producing non-porous ceramic ware by my improved method.

Other objects and advantages of the invention will appear from the following detailed description taken in conjunction with the accompanying drawings, in which:

Figure 1 is an elevational view, partly in section and partly in elevation, showing schematically a preferred form of apparatus for practicing the present invention;

Figure 3:
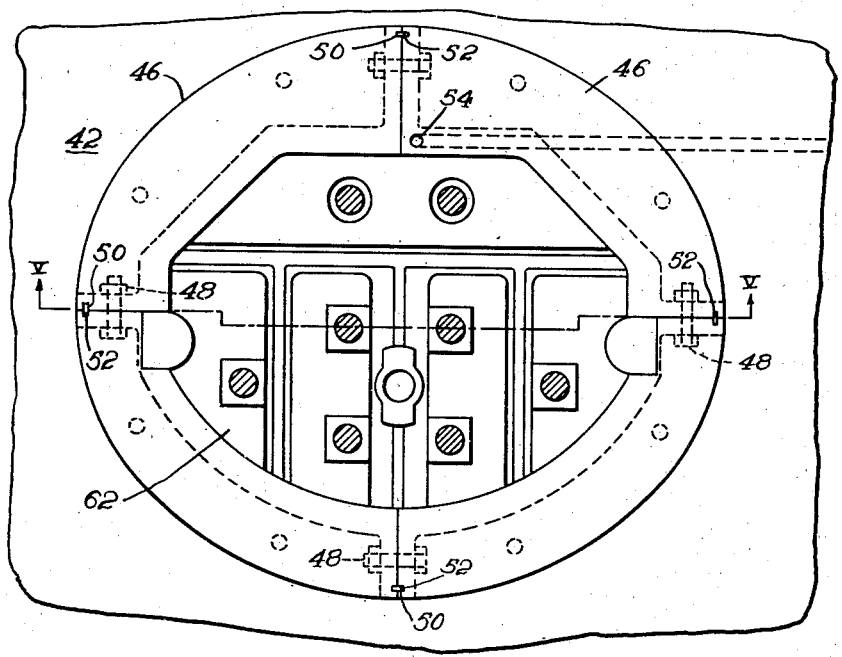
Fig. 3 is an enlarged plan view of the mold casing and lower die of Fig. 1.

In Figure 1 is shown a press for practicing the invention including a mold table 2 supported by legs 4 and, in turn, supporting a pair of guide rods indicated at 6. The upper ends of the rods 6 are provided with shoulder portions at 8 for mounting an upper supporting plate 10, upon which is disposed a hydraulic cylinder 12. A plunger 14, which is attached to a piston 16 within the cylinder 12, extends downwardly through the supporting plate 10 to support a reciprocable crosshead 18 by means of a bolt 20. The crosshead includes guide projections 22 for engaging the guide rods 6 and, in addition, has upwardly extending screw-threaded rods 24 secured thereto in any suitable manner. These rods extend through openings 26 in the plate 10, and have nuts 28 threaded thereon to adjustably limit the upward travel of the crosshead 18. A lower die assembly indicated generally at 30 is disposed on the mold table 2, while a cooperating upper assembly 32 is supported from and movable with the crosshead 18.

Figure 5:
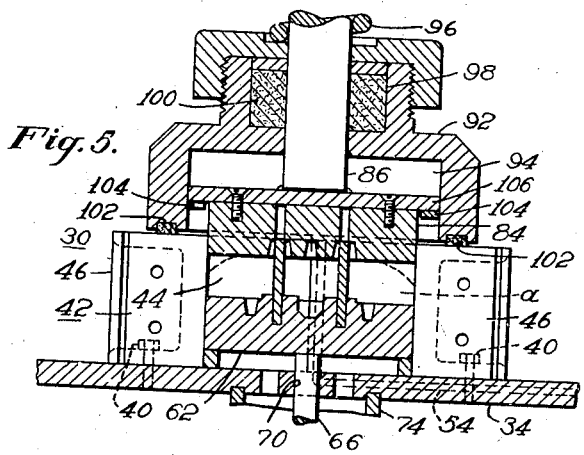
Fig. 5 is a sectional view taken along the line V—V of Fig. 3 at a reduced scale and showing the structure in a more advanced stage of operation than the view of Fig. 1.

Referring also to Figs. 3 and 5, the lower assembly 30 includes a base plate 34 detachably secured to the table 2 by any suitable means, such as by bolts 36, engaging a channel portion 38 therein. Secured to the plate 34, as by bolts 40, is a casing 42 defining a mold chamber at 44. This casing preferably comprises a plurality of sections 46 bolted together, as at 48, and having grooves 50 in the adjoining surfaces for receiving sealing gaskets 52. A vent 54 extends from the upper surface of the casing 42 through the plate 34 to communicate with a pipe 56. The pipe 56 communicates with a vacuum tank or pump (not shown) through a valve 58, and includes a gage 60 for indicating the pressure in the mold.

Figures 2, 4:
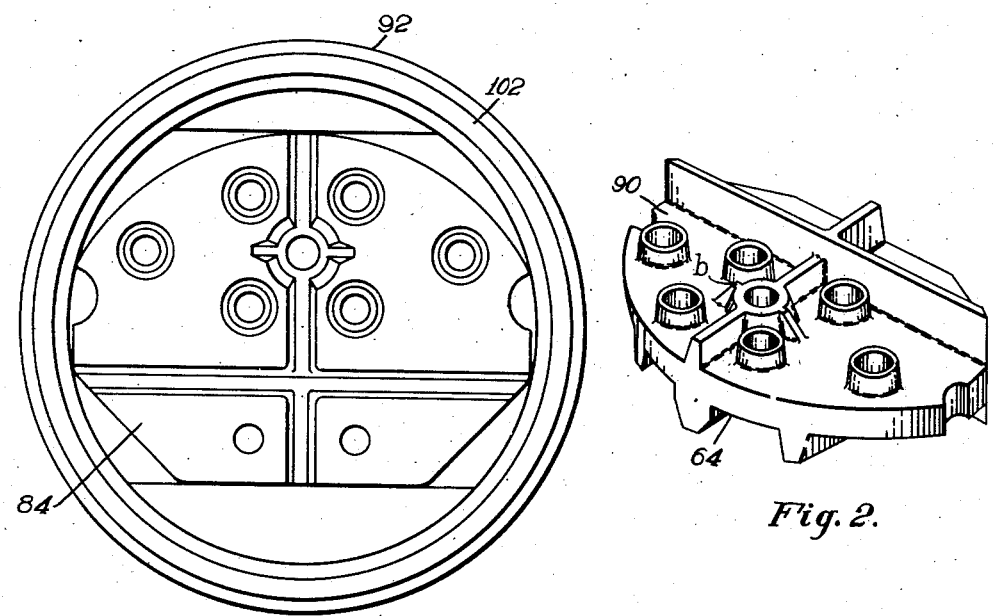
Fig. 2 is a perspective view of a ceramic body shaped with the apparatus of Fig. 1.
Fig. 4 is an enlarged bottom view of the upper casing and die of Fig. 1.

In the chamber 44 is disposed a metal die 62 of the proper shape to form the lower portion 64 of a transformer tap changer shown in Fig. 2. This die is adapted to ordinarily rest against the base plate 38 as shown, but includes a plunger 66 secured thereto in any suitable manner for moving it upwardly in response to movement of a foot treadle 68 to push the completed ware out of the mold chamber 44. This rod or plunger extends through a centrally disposed aperture 70 in the plate 34 and another aperture 72 in a sealing chamber 74. The chamber 74 is welded to the plate 38 around the aperture 70 and includes a stuffing box and gasket at 76 for sealing the rod around the aperture 72. A flat valve is provided at 78 for permitting the escape of air from the sealing chamber when the die 62 is returned to its lower position upon release of the treadle 68, and a removable sealed cover member 80 is provided for a cleaning opening 82 in the sealing chamber.

The upper assembly unit 32 includes a metal die 84 secured to the lower end of a plunger 86, the upper end of which is secured to a plate 88 attached to the crosshead 18. The die 84 is shaped to form the upper surface 90 of the ceramic article shown in Fig. 2. An upper casing 92, forming a chamber portion 94 within which the die 84 may be disposed, is located on the plunger 86 with a spiral spring 96 biasing it downwardly from the crosshead 18. The casing 92, which is movable with respect to the plunger 86, defines a stuffing box 98 within which is disposed packing material 100 for forming an air-tight seal therebetween. The chamber in the upper casing is of somewhat larger cross-section than the mold chamber, and a sealing gasket of rubber or like material is embedded in a groove in the lower surface of the casing as shown at 102. This gasket 102 is arranged to seat against the upper surface of the casing 42 at a point outside of the evacuating vent to further seal the mold chamber against the entrance of the outside atmosphere. The die is designed to fit somewhat loosely in the mold chamber 44 so that air may be evacuated therefrom even though the compressing action is taking place and the die 84 is within the mold chamber. A plurality of stops 104 are disposed around the periphery of the die 84 on a die supporting plate 106 to prevent the two dies from contacting and being damaged in case the press is accidentally operated without enough material therein.

As is further shown in Fig. 1, a usual type four-way valve 108 is operated by means of a handle 110 to control the movement of the upper die and the upper casing. A pipe 112 extends to the valve from the tank or other source of hydraulic pressure (not shown), while a fluid return pipe 114 also communicates with the valve. Upon movement of the valve to one position, the fluid under pressure enters the upper part of the cylinder 12 through a supply pipe 116 to move the crosshead 18 downwardly with a pressure indicated on a pressure gage at 118. Operation of the valve to the other operating position will cause the fluid to flow into the lower portion of the cylinder through the pipe 120 to move the crosshead upwardly, while the fluid in the upper portion of the cylinder is placed in communication with the return pipe 114.

To obtain a dense non-porous article in accordance with the invention, I find it necessary to employ a batch of material differing from the usual dry mix. The preferred way of preparing a suitable material is to initially form a slip with 10% or less of ball clay instead of the 20 to 30% generally employed. This slip is then cast into a simple plaster mold container and allowed to dry to approximately 17.5% moisture, after which the material is disintegrated to produce dampened dust without balling. The material may also be prepared from a typical plastic vitreous insulator material by shredding or grating it into comparatively small particles after drying to approximately 17.5% moisture content.

I have discovered that the use of the smaller than usual percentage of present commercial ball clay enables one to obtain a more dense and non-porous product. This probably is due to the relative coarseness of grind of commercial air-floated ball clay as compared to that of air-floated kaolin, and this reduction in average particle size permits the various particles to be more densely packed together. With my process and apparatus, the material is sufficiently plastic to flow into the die crevices despite the relatively low ball clay content. In addition, the method results in a pressed article having sufficient dry strength even though it was formerly considered necessary to utilize a higher percentage of ball clay for this purpose.

Where a typical plastic mix is broken down into small particles as previously described, this reduction in particle size permits a dense pressed article to be formed with my method for much the same reason indicated above.

For pressing intricate shapes, such as those having outwardly extending edges, ribs or posts of a height in the order of the thickness of the main body portion, it has been found that best results may be obtained by using a material having a moisture content of between 17 and 18%. Such a mix is somewhat wetter than is employed in dry press processes while considerably drier than is used in wet processes. Since such a mix when used with my improved pressing method produces a product substantially as dense as wet process porcelain, I prefer to classify the process as a "semi-wet" one. In the case of more simple shapes, the amount of moisture in the mix may be reduced somewhat without impairing the density of the ware. I have produced non-porous simple shapes with my method and apparatus, using material having a moisture content as low as 14.5%.

In shaping an article in accordance with the invention, the dies and mold chamber are oiled with lard oil or kerosene in a usual manner and a predetermined weight of porcelain batch, such as is described above, and having a moisture content of approximately 17.5%, is introduced into the mold chamber 44 with the crosshead 38 and upper die unit 32 at their uppermost positions. The material is placed on the lower die 62 in an uneven pile, such as is indicated at $a$ in Fig. 1, while it is densed with the fingers, or with a simple wooden form, around the edge of the die or around the location for a thickened portion, such as the post indicated at $b$ in Fig. 2.

Upon introducing the pressure fluid into the cylinder 12 through the valve 108, the upper die unit 32 is forced downwardly so that the gasket 102 is compressed between it and the upper surface of the mold casing 42 to seal the space including the mold chamber 44 and the upper die chamber 94. The seal at this gasket is easily maintained by the spring 96, since the casing 92 is free for a limited lateral movement with respect to the rod 86 to ensure proper seating.

With the mold chamber sealed as above-described and the die 84 in the upper portion of chamber 94, the air is evacuated from the material $a$ and the chamber through the vent 54 by opening the valve 58. After the mold chamber has been evacuated to one-fourth of an atmosphere or less, the control handle 110 is operated to move the upper die down into contact with the material $a$, as shown in Fig. 5.

Because of the uneven pile in which the batch of material is originally disposed, and because of the increased density of the pile at portions due to the tamping operation, the material moves with a lateral sliding action into the crevices in the dies. The lateral sliding action between the particles has been found to greatly decrease the porosity of the pressed piece over that which is obtained without the uneven piling and tamping of the material. Since the upper die 84 does not fit precisely against the walls of the mold chamber, but leaves a small space therebetween, the evacuation of air from between the dies will continue even during the compressing.

After the initial operation, the pressure is reduced and the upper die 84 separated from the surface of the material without, however, breaking the seal between the two casings. The die is then lowered again with approximately the same pressure initially used. This procedure is preferably repeated through three or more cycles since the material has a tendency to expand slightly after being compressed with the result that this bumping action results in an increased amount of the highly desirable sliding action between particles. For the particular piece of ware shown in Fig. 2, it is preferred to employ a pressure of about 800 pounds per square inch, although satisfactory pieces of different shapes have been pressed with pressures ranging between 200 and 1000 pounds per square inch. Where the lower pressures are used, increased bumping action is recommended.

Although the pressing cycles must be manually controlled by means of the handle 110 with apparatus shown, it will be understood that an automatic control may be installed in the hydraulic pressure circuit to automatically compress and release the material the desired number of times.

After completing the pressing, the entire upper die assembly unit is moved to its uppermost position separating the upper and lower casings. The foot treadle 68 is then operated to push the completed ware out of the mold chamber to facilitate its removal from the press.

Figure 6:
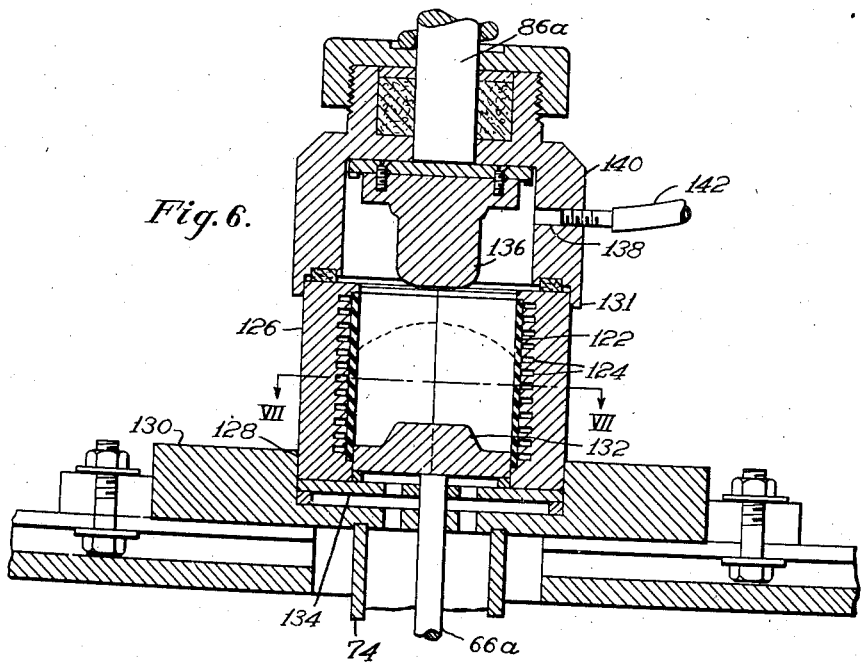
Fig. 6 is a view similar to Fig. 5 of a modified type of mold for pressing a different shape.
Figure 7:
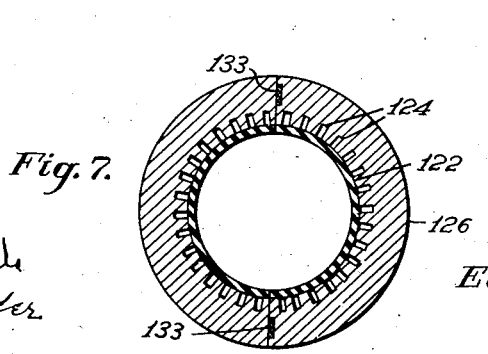
Fig. 7 is a horizontal sectional view taken along the line VII—VII of Fig. 6.

In Figs. 6 and 7 is shown a modified mold and die structure for forming a high-voltage insuator having a height of a dimension in the same order as its transverse dimensions. In order to more densely pack the middle portion of the insulator, a resilient wall portion 122 which may be of rubber or a synthetic material, is fitted over bores or recesses 124 in the inner surface of a mold casing 126 and preferably vulcanized thereto. The cylindrical casing 126 and the resilient wall or liner are split along the axes into two closely fitting halves. The casing fits snugly into a circular well 128 in a base plate 130 and a perimetral projection 131 on the upper casing 140 engages the upper end of the mold casing to maintain it together during the pressing operation. The base plate is secured to the table 2 in the manner previously described, while a plunger 66a extends therethrough to engage a lower die 132. A plate 134 is secured to the plunger 66a to push the mold casing out of the well 128 in response to upward movement of the plunger to permit separation of the casing portions and removal of the ware. Movement of the plunger 66a is controlled through the foot treadle of Fig. 1. The mold member is preferably gasketed as indicated at 133.

An upper die 136 is secured to a plunger 86a and within an upper casing 140, both of which are substantially the same as the corresponding parts of Fig. 1. Because of the presence of the bores 124 in the mold casing 126, it may be preferable to evacuate through an opening 138 in the upper casing 140 by means of a hose 142 connected to the vacuum chamber.

The method of shaping ware with the mold equipment of Fig. 6 is the same as that previously described, so that further explanation is rendered unnecessary. When this flexible mold chamber is used, the material 122 will give inwardly at the bore 124 so that a lateral sliding action may take place between particles of the batch throughout. In the absence of the resilient wall, the particles at the center of such a relatively long piece would be moved only longitudinally during the compressing operation, and hence the portion of the material would not have the high density which results from the sliding action. Ribs or creepage flanges may be turned on the insulator shaped in this mold prior to firing.

Porcelain articles pressed into shape in the manner described above have proven to be particularly uniform and free from porosity when fired in the usual manner for producing vitreous porcelain ware. Articles of complicated shapes may conveniently be produced with substantially the same density and freedom from absorption as is possessed by wet process porcelain. In addition, the structure is vastly superior to any which can be produced by dry press methods of the prior art.

Although particular embodiments of the invention have been shown and described, it will be evident that various modifications may be made in the methods and apparatus without departing from its scope. For this reason, it is intended that the invention be limited only by the following claims interpreted in view of the prior art.

I claim as my invention:

1. The method of forming a porcelain body for firing to provide an insulating device having substantially the density of wet process porcelain comprising introducing fine particles of dampened porcelain material into a mold between rigid dies, densening portions only of said material, compressing said material between said dies with a pressure exceeding 200 pounds per square inch to cause the particles therein to move over each other with a transverse sliding motion, and evacuating the air from the mold and the material simultaneously with said compressing operation.

2. The method of completely forming a porcelain body for firing to provide an insulating device having substantially the density of wet process porcelain comprising compressing a granular porcelain batch including between 14% and 18% moisture between rigid non-porous dies, substantially reducing and then increasing the compressing force at least once during the compressing operation, and evacuating the air from between the dies and from the batch simultaneously with the compressing operation.

3. The method of forming a porcelain body for firing to provide a vitreous insulating device having substantially the density of wet process porcelain comprising introducing fine particles of dampened porcelain material into a mold formed between relatively movable rigid dies in an uneven pile, tamping portions of said material to densen them, compressing said material between said dies to move the particles of said material into the desired shape with a laterally sliding motion, relieving the compressive force on said material by separating one of said dies therefrom, recompressing said material, and evacuating the air from the mold during and between the compressing operations.

4. The method of completely forming a porcelain body having a raised portion extending from a main body portion for firing to provide an insulating device having substantially the density of wet process porcelain comprising introducing a batch of granular porcelain material having between 14% and 18% moisture into a mold formed between relatively movable rigid dies shaped to form said raised portion, tamping the material at the location of the raised portion, compressing the material between the dies and evacuating the air from the mold and the material simultaneously with the compressing operation.

5. The method of forming a porcelain body for firing having a raised portion extending from a main body portion to provide an insulating device having substantially the density of wet process porcelain comprising introducing fine particles of dampened porcelain material into a mold formed between relatively movable rigid dies, densening the material at the location of the raised portion, compressing said material between said dies a plurality of times by separating one of the dies from the material between compressing operations, and evacuating the air from the mold and material during and between said compressing operations.

6. The method of forming a porcelain body for firing having a raised portion extending from a main body portion to provide an insulating device having substantially the density of wet process porcelain comprising introducing a dampened porcelain batch including not more than 10% of ball clay in an uneven pile into a mold formed between relatively movable rigid dies shaped to form said raised portion, tamping a portion of the batch at the location of the raised portion to initially increase its density, compressing the material between said dies a plurality of times and separating one of the dies from the material between compressing operations, and evacuating the air from the mold and batch during and between said compressing operations.

7. The method of forming a porcelain body for firing to provide a vitreous insulating device having substantially the density of wet process porcelain comprising introducing a dampened porcelain batch including not more than 10% of ball clay into a mold formed between relatively movable rigid dies in an uneven pile, manually tamping a portion only of the batch to increase the density of said portion, compressing the material between the dies a plurality of times with the pressure applied thereto during at least one of the times exceeding 200 pounds per square inch and separating one of the dies from the material between compressing operations, and evacuating the air from the mold and batch during and between said compressing operations.

8. The method of forming a porcelain body for firing to provide an insulating device having substantially the density of wet process porcelain comprising introducing a dampened batch of porcelain material into a split mold formed between relatively movable rigid dies and having a resilient side wall portion, compressing the material between the dies a plurality of times and separating one of the dies from the material between compressing operations, evacuating the air from the mold and material during and between said compressing operations, and separating said mold to permit removal of the body therefrom.

9. The method of forming a porcelain body for firing to provide a vitreous insulator having substantially the density of wet process porcelain, comprising introducing a batch of granular porcelain material having between 14% and 18% moisture content into a mold formed between relatively movable rigid non-porous dies in such a position that the particles of the batch will move with a transverse sliding action in response to a compressive force applied along the line of relative movement of the dies, displacing substantially all of the air from the mold, and compressing the material between the dies a plurality of times without removing it from the mold, the pressure exerted on said material during at least one of said compressing operations being at least 200 pounds per square inch.

10. The method of forming a porcelain body for firing to provide a dense vitreous insulator having a first dimension at least substantially as great as a second dimension substantially perpendicular thereto comprising, introducing a batch of granular porcelain material having between 14% and 18% moisture content into an axially split mold having a resilient wall portion and between relatively movable rigid dies adapted to shape the ends of the body bounding said first dimension, compressing the material between the dies a plurality of times so that the resilient portion of the mold will permit a transverse sliding movement between the particles of material, evacuating air from the material during the compressing operations, and separating said split mold to remove the body therefrom.

11. The method of completely forming a body of electrical porcelain preparatory to drying and firing comprising introducing a quantity of porcelain material, having between 14% and 18% moisture, in an uneven pile in a mold consisting of relatively movable non-porous dies, tamping a portion only of said material to increase the density of said portion, evacuating the air from said mold and material, compressing said material between said dies to the desired finished body shape while in the evacuated state, and then removing said completely formed body from the mold for drying.

12. The method of forming a complete electrical porcelain body of intricate shape preparatory to drying and firing, said body to have a uniform density comparable to wet-process porcelain, comprising introducing a predetermined quantity of granulated porcelain material, having a moisture content of from 14% to 18%, into a mold consisting of relatively movable metallic dies, manually tamping portions of said material so that portions thereof are initially denser than others, compressing said material between said dies, evacuating air from the material during the compressing operation, then separating the dies and removing the completed body for drying and firing.

EUGENE H. FISCHER.